(12) United States Patent
Kim et al.

(10) Patent No.: US 8,610,859 B2
(45) Date of Patent: Dec. 17, 2013

(54) LIQUID CRYSTAL DISPLAY DEVICE ASSOCIATED WITH TOUCH PANEL AND METHOD FOR FABRICATING THE SAME

(75) Inventors: Tae-Hwan Kim, Seoul (KR); Tae-Hoon Kim, Daegu (KR)

(73) Assignee: LG Display Co., Ltd., Seoul (KR)

( * ) Notice: Subject to any disclaimer, the term of this patent is extended or adjusted under 35 U.S.C. 154(b) by 180 days.

(21) Appl. No.: 13/156,953

(22) Filed: Jun. 9, 2011

(65) Prior Publication Data

US 2011/0304571 A1      Dec. 15, 2011

(30) Foreign Application Priority Data

Jun. 10, 2010  (KR) .......................... 10-2010-0054967

(51) Int. Cl.
*G02F 1/1343* (2006.01)

(52) U.S. Cl.
USPC ............................ 349/139; 349/187; 345/173

(58) Field of Classification Search
None
See application file for complete search history.

(56) References Cited

U.S. PATENT DOCUMENTS

| | | | |
|---|---|---|---|
| 6,538,706 B2 | 3/2003 | Sun | |
| 2004/0135773 A1* | 7/2004 | Bang et al. | 345/173 |
| 2008/0062139 A1* | 3/2008 | Hotelling et al. | 345/173 |
| 2008/0062148 A1 | 3/2008 | Hotelling et al. | |
| 2009/0086113 A1* | 4/2009 | Ko et al. | 349/12 |
| 2010/0001969 A1* | 1/2010 | Saito et al. | 345/173 |
| 2010/0225612 A1* | 9/2010 | Ishizaki et al. | 345/174 |
| 2010/0231549 A1* | 9/2010 | Chien et al. | 345/174 |
| 2011/0304564 A1* | 12/2011 | Kim et al. | 345/173 |
| 2012/0182261 A1* | 7/2012 | Wang et al. | 345/174 |
| 2012/0218198 A1* | 8/2012 | Shin et al. | 345/173 |

FOREIGN PATENT DOCUMENTS

| | | | |
|---|---|---|---|
| CN | 101266348 A | | 9/2008 |
| JP | 5-19233 A | * | 1/1993 |
| JP | 2009-116236 A | * | 5/2009 |

* cited by examiner

*Primary Examiner* — Mike Stahl
(74) *Attorney, Agent, or Firm* — Birch, Stewart, Kolasch & Birch, LLP

(57) ABSTRACT

The present invention relates to a liquid crystal display device associated with a touch panel, the device includes a liquid crystal panel having opposite first and second substrates, and a liquid crystal layer formed between the first and second substrates, a plurality of driving electrodes arranged on an outer surface of the second substrate in one direction spaced from one another, a first polarizing plate formed on the outer surface of the second substrate including the driving electrodes, a third substrate opposite to the first polarizing plate, and a plurality of sensing electrodes formed on a surface of the third substrate opposite to the first polarizing plate perpendicular to the driving electrodes spaced from one another.

19 Claims, 6 Drawing Sheets

LIQUID CRYSTAL DISPLAY DEVICE ASSOCIATED WITH TOUCH PANEL AND METHOD FOR FABRICATING THE SAME

CROSS REFERENCE TO RELATED APPLICATION

This application claims the benefit of the Korean Patent Application No. 10-2010-0054967, filed on Jun. 10, 2010, which is hereby incorporated by reference as if fully set forth herein.

BACKGROUND OF THE DISCLOSURE

1. Field of the Disclosure

The present invention relates to liquid crystal display devices, and more particularly to a liquid crystal display device associated with a touch panel, in which driving electrodes are formed on an outer surface of a color filter substrate of a liquid crystal panel by patterning for cutting off noise from the liquid crystal panel and fabricating slimmer and more integrated device.

2. Discussion of the Related Art

Currently, as the time turns into a full scale information oriented time, a display field in which an electric information signal is expressed in a visual sensation has been developed rapidly, and, meeting to this development, various kinds of flat display devices have been developed, which have excellent features of slimmer, lighter, and lower power consumption, to replace present cathode ray tube CRT, rapidly.

As specific examples of the flat display devices, there are the liquid crystal display device LCD, a plasma display panel device PDP, a field emission display device FED, and an electro luminescence display device ELD, each of which essentially has a flat display panel in common for producing a picture. The flat display panel is provided with one pair of transparent insulating substrates bonded opposite to each other with a unique light emitting or polarizing material layer disposed therebetween.

Of the flat display devices, the liquid crystal display device displays a picture by controlling light transmissivity of liquid crystals by using an electric field. To do this, the liquid crystal display device is provided with a display panel having liquid crystal cells, a backlight unit for directing the light to the display panel, and a driving circuit for driving the liquid crystal cells.

The display panel is formed to define a plurality of pixel regions as a plurality of gate lines and a plurality of data lines are crossed each other. In this instance, each of the pixel regions has a thin film transistor array substrate and a color filter array substrate opposite to each other, spacers positioned for maintaining a fixed cell gap between the two substrates, and liquid crystals filled in the cell gap.

The thin film transistor substrate is provided with gate lines and data lines, a thin film transistor formed at every crossed portion of the gate lines and the data lines as a switching device, a pixel electrode formed for each liquid crystal cell connected to the thin film transistor, and an alignment film coated on above elements. The gate lines and the data lines have signals supplied thereto from the driving circuit through respective pads.

The thin film transistor supplies a pixel voltage signal supplied to the data line to the pixel electrode in response to a scan signal supplied to the gate line.

The color filter array substrate is provided with a color filter formed for each of the liquid crystal cells, a black matrix for defining the color filters and reflection of an external light, a common electrode for supplying a reference voltage to the liquid crystal cells in common, and an alignment film coated thereon.

By aligning and bonding the thin film transistor substrate and the color filter array substrate fabricated thus individually opposite to each other, injecting the liquid crystals between the two substrates, and sealing the two substrates, the liquid crystal panel is completed.

Recently, requirements for addition of a touch panel to the liquid crystal display device are increasing for perception of a portion of the touch panel touched with a hand or additional input means and transmission of additional information matched to the touch.

Depending on touch sensing types, in the touch panels, there are a resistance type, a capacitive type, and an infrared ray sensing type, and, recently, the capacitive type is paid attention in small sized models, taking convenience of fabrication, sensing capability, and so on into account.

A related art liquid crystal display device will be described with reference to the attached drawings.

FIG. 1 illustrates a section of a related art liquid crystal display device having a touch panel attached thereto.

Referring to FIG. 1, the related art liquid crystal display device is provided with a liquid crystal panel 10 having first and second substrates 1 and 2 opposite to each other, a liquid crystal layer 3 filled therebetween, and first and second polarizing plates 4a and 4b attached to back sides of the first and second substrates 1 and 2 respectively, a touch panel 20 placed on the liquid crystal panel for operating in a capacitive type, and a cover glass 30 on the touch panel for protecting the touch panel 20.

Formed on the first substrate 1 of the liquid crystal panel 10, there are gate lines and data lines perpendicular to each other to define pixel regions, a thin film transistor TFT formed at every crossed portion of the gate lines and the data lines, and a thin film transistor array formed on the pixel region to have pixel electrodes (not shown).

And, formed on the second substrate 2, there are a black matrix layer, color filter layer, and a common electrode (not shown, Vcom (applied voltage)).

The touch panel 20 has an inside structure which is different with types of the touch panel 20. For an example, a capacitive type senses a touch by detecting a capacitance change at a touch point, and has first and second electrodes formed to cross each other and an insulating film formed between the first and second electrodes for sensing the touch by detecting the change of capacitance induced between the electrodes at the time of the touch.

And, in order to protect the touch panel 20, the cover glass 30 is formed on the touch panel 20, additionally.

Formed between the liquid crystal panel 10 and the touch panel 20, there is a shielding layer (not shown) for preventing driving of the liquid crystal panel 10 from giving influence to the touch panel 20. The shielding layer is formed of a transparent electrode to have an adequate thickness for enabling transmission of a picture from the liquid crystal panel 10 therethrough, and preventing driving noise of the liquid crystal panel 10 from entering into the touch panel 20.

In the meantime, the related art touch panel attached type liquid crystal display device requires an adhesive layer between the liquid crystal panel 10 and the touch panel 20. In this case, a step for forming the touch panel 20 is required in addition to the steps for fabricating the liquid crystal panel 10, and a step for attaching the touch panel 20 to the liquid crystal panel 10 is also required.

However, the related art touch panel attached type liquid crystal display device has the following problems.

In the related art touch panel attached type liquid crystal display device, in order to prevent the driving noise of the liquid crystal display device from giving influence to the touch panel, the shielding transparent electrode of an adequate thickness and small resistance is required. However, this case requires not only an additional shielding transparent electrode, but also an additional step for forming the same.

Along with this, the disposition of the shielding transparent electrode between the liquid crystal panel 10 and the touch panel 20 causes transmissivity poor.

Moreover, as a variation of the touch panel attached type liquid crystal display device, first and second electrodes are formed on both sides of a touch panel glass substrate of the touch panel, and an additional insulating film is formed for protecting underlying electrodes and preventing noise from infiltrating. In this case, patterning of the insulating film on a backside of the touch panel glass substrate is also required for application of a signal, to cause problems in that additional steps, and material are required, and transmissivity becomes poor.

And, in a case the electrodes are formed on both sides of the touch panel glass substrate, the touch panel glass substrate is required to turn over for performing required steps, causing problems in that a process time period is increased, and defects, such as scratch or formation of foreign matter, increases.

SUMMARY OF THE DISCLOSURE

Accordingly, the present invention is directed to a liquid crystal display device associated with a touch panel.

An object of the present invention is to provide a liquid crystal display device associated with a touch panel, in which driving electrodes are formed on an outer surface of a color filter substrate of a liquid crystal panel by patterning for cutting off noise from the liquid crystal panel and fabricating slimmer and more integrated device.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device associated with a touch panel includes a liquid crystal panel having opposite first and second substrates, and a liquid crystal layer formed between the first and second substrates, a plurality of driving electrodes arranged on an outer surface of the second substrate in one direction spaced from one another, a first polarizing plate formed on the outer surface of the second substrate including the driving electrodes, a third substrate opposite to the first polarizing plate, and a plurality of sensing electrodes formed on a surface of the third substrate opposite to the first polarizing plate perpendicular to the driving electrodes spaced from one another.

In this instance, both the driving electrodes and the sensing electrodes are transparent electrodes. It is preferable that the driving electrode has sheet resistance of below 100Ω/□.

And, the driving electrodes have a square wave applied thereto in succession. And, in this case, it is preferable that the square wave includes two potential levels of a constant voltage and a ground voltage.

And, the device can further include driving pad electrodes formed at an edge of the outer surface of the second substrate connected to the driving electrodes with first routing lines respectively, and a first FPC (a first Flexible Printed Circuit) connected to the driving pad electrodes, and can further include sensing pad electrodes formed on a surface of the third substrate opposite to the first polarizing plate connected to the sensing electrodes with second routing lines respectively, and a second FPC formed on a surface of the third substrate opposite to the first polarizing plate connected to the sensing pad electrodes.

In this instance, the first FPC and the second FPC are connected to a driving circuit board of the liquid crystal panel. The first FPC and the second FPC can be connected to the driving circuit board of the liquid crystal panel through connectors, respectively.

In the meantime, the device can further include a touch driving IC included to the first FPC or the second FPC, or a touch driving IC included to the driving circuit board of the liquid crystal panel.

And, the device can further include a protective film on the third substrate. The protective film can be a glass substrate or an insulating transparent film for improving a touch sensitivity of the user and protecting underlying electrodes.

In the meantime, the third substrate can be a glass substrate, or an insulating transparent film.

Depending on cases, the device can further include an adhesive layer disposed between the third substrate and the first polarizing plate additionally, or instead of the adhesive layer, a closed loop of adhesion paste formed at an edge of the first polarizing plate between the third substrate and the first polarizing plate additionally for bonding the third substrate to the first polarizing plate.

And, the device can further include a second polarizing plate on an outer surface of the first substrate.

In this instance, the device further includes a thin film transistor array on an inner surface of the first substrate, and color filter array on an inner surface of the second substrate.

And, in another aspect of the present invention, a method for fabricating a liquid crystal display device associated with a touch panel includes the steps of forming a plurality of driving electrodes in one direction spaced from one another by depositing a transparent electrode on one surface of a first substrate and patterning the transparent electrode, turning over the first substrate, and performing a color filter array step on the other surface of the first substrate, performing a thin film transistor array step on a second substrate, forming a liquid crystal panel by bonding the first and second substrates after forming a liquid crystal layer between the first and second substrates, forming a first polarizing plate on the one surface of the first substrate to cover the driving pad electrodes, forming a plurality of sensing electrodes on the third substrate in a direction perpendicular to the driving electrodes spaced from one another, and bonding the third substrate to the first polarizing plate such that a surface of the third substrate having the sensing electrodes formed thereon is opposite to the first polarizing plate.

In this instance, the device can further include the step of forming a second polarizing plate on an outer surface of the second substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 1:
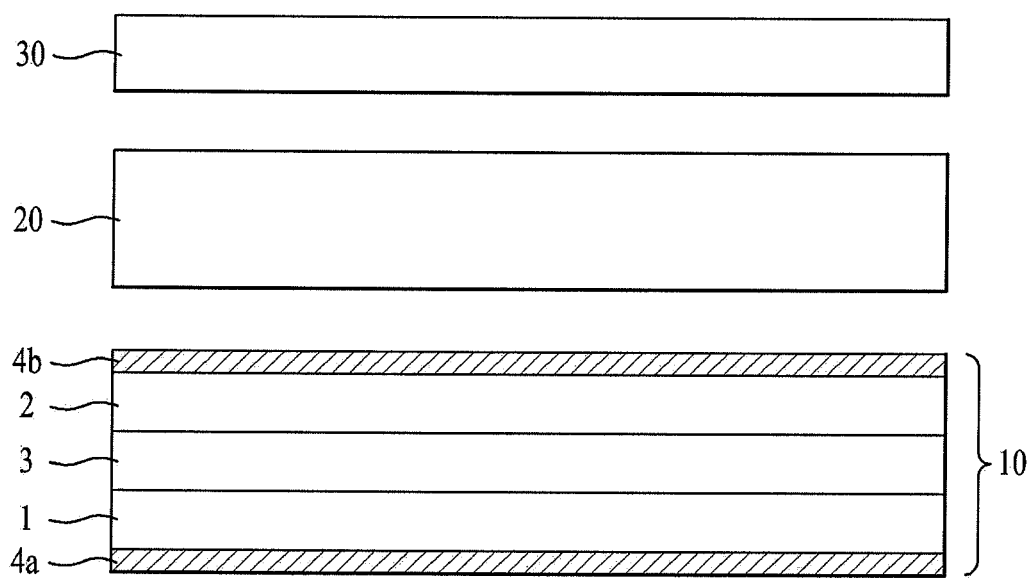
FIG. 1 illustrates a section of a related art liquid crystal display device having a touch panel attached thereto.
Figure 2:
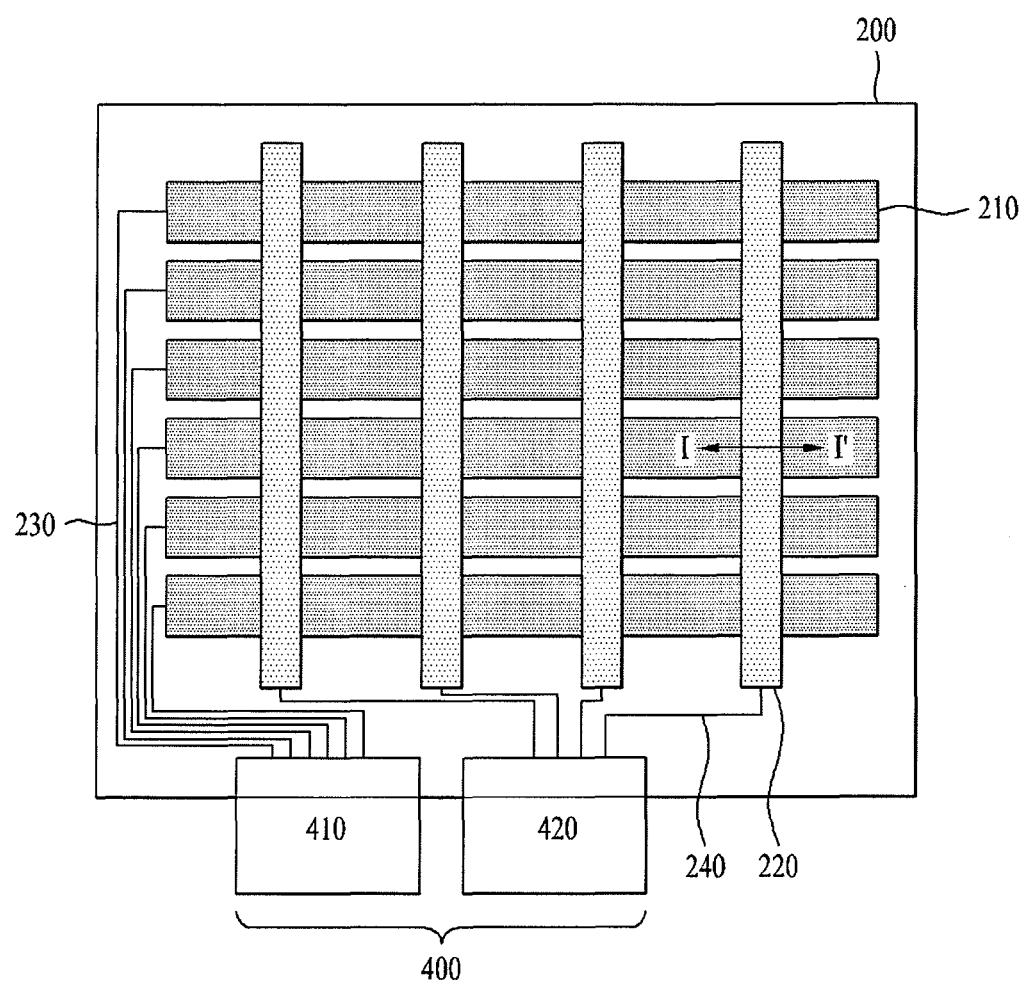
FIG. 2 illustrates a plan view of a liquid crystal display device associated with a touch panel in accordance with a preferred embodiment of the present invention.
Figure 3:
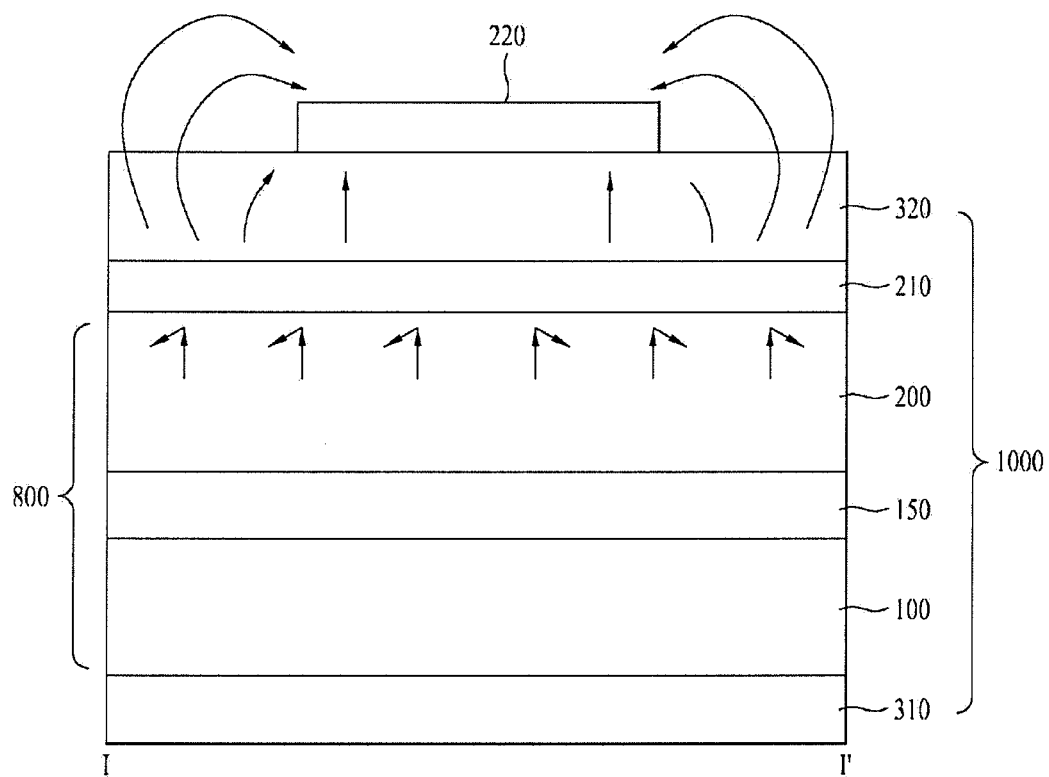
FIG. 3 illustrates a schematic view of FIG. 2.

FIG. 2 illustrates a plan view of a liquid crystal display device associated with a touch panel in accordance with a preferred embodiment of the present invention, and FIG. 3 illustrates a schematic view of FIG. 2.

Referring to FIGS. 2 and 3, the liquid crystal display device associated with a touch panel includes a liquid crystal panel 800 having a thin film transistor substrate 100 and a color filter array substrate 200 opposite to each other, and a liquid crystal layer 150 formed between the thin film transistor substrate 100 and the color filter array substrate 200, a plurality of driving electrodes 210 formed on a back side of the color filter array substrate 200 of the liquid crystal panel 800 in one direction spaced from one another, a first polarizing plate 320 formed on the outer surface of the color filter array substrate 200 including the driving electrodes 210, a third substrate 600 (See FIG. 4) opposite to the first polarizing plate 320, and a plurality of sensing electrodes 220 formed on a surface of the third substrate 600 opposite to the first polarizing plate 320 perpendicular to the driving electrodes 210 spaced from one another.

The liquid crystal display device associated with a touch panel also includes driving pad electrodes 231 (See FIG. 4) formed at an edge of the outer surface of the color filter array substrate 200 respectively connected to the driving electrodes 210 with first routing lines 230, a first FPC (a first Flexible Printed Circuit) 410 connected to the driving pad electrodes 231, sensing pad electrodes 241 formed on a surface of the third substrate 600 (See FIG. 4) opposite to the first polarizing plate 320 connected to the sensing electrodes 220 with second routing lines 240, and a second FPC 420 connected to the sensing pad electrodes 241. In FIG. 2, reference number 400 refers to Flexible Printed Circuits (FPCs) including the first FPC 410 and the second FPC 420.

In the meantime, both the driving electrodes 210 and the sensing electrodes 220 are formed of transparent material for forwarding an image from the liquid crystal panel 800, for an example, ITO (Indium Tin Oxide), IZO (Indium Zinc Oxide), ITZO (Indium Tin Zinc Oxide), or ATO (Antimony Tin Oxide).

In this case, referring to FIG. 3, the driving electrode 210 is formed to have a sheet resistance of below 100Ω/□, and a voltage to be applied to the driving electrode 210 is set to be a square wave having two levels of a constant voltage Vd or a ground voltage 0V GND for preventing noise generated at the liquid crystal panel 800 from entering upward. According to this, influence of the noise of the liquid crystal panel to touch driving can be prevented.

That is, when the square wave of a voltage signal is applied to a driving electrodes 210 side in succession and a touch takes place at a predetermined portion, by reading a capacitance change with respect to the sensing electrodes 220, whether the touch is made or not is determined and the touched portion is sensed. In this instance, the noise from a liquid crystal panel 800 side is cut-off taking the driving electrodes 210 as a boundary.

In the meantime, the liquid crystal panel 800, the first polarizing plate 320 and the driving electrodes 210 are called as a polarizing plate embedded liquid crystal panel 1000, collectively.

And, an unexplained reference numeral 310 denotes a second polarizing plate 310 formed under the thin film transistor array substrate 100 of the liquid crystal panel 800.

A liquid crystal display device associated with a touch panel of the present invention will be described in detail embodiment by embodiment.

Figure 4:
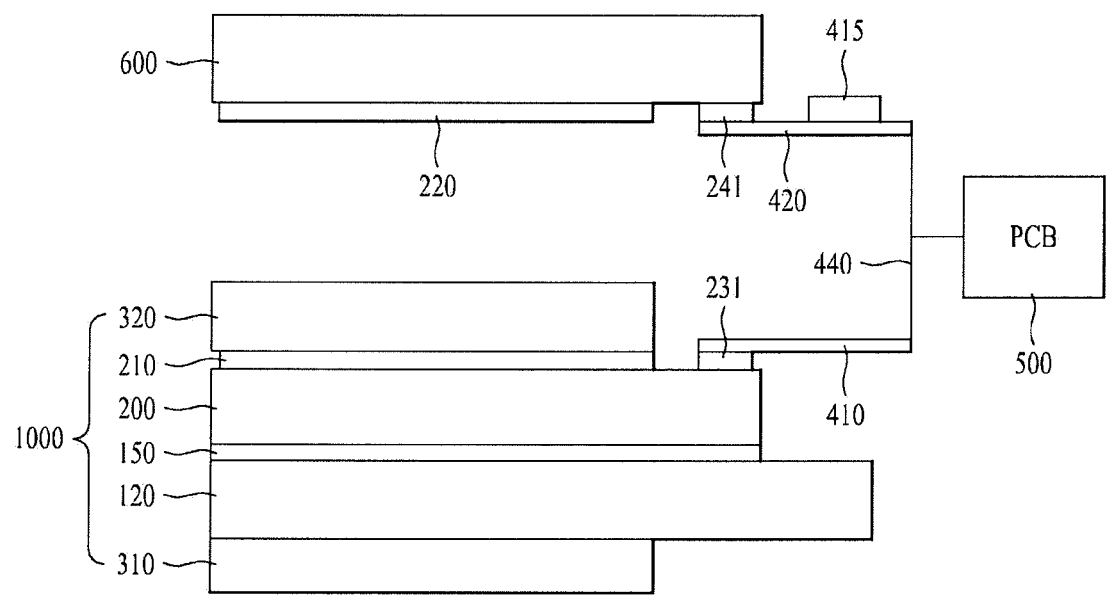
FIG. 4 illustrates a section of a liquid crystal display device associated with a touch panel in accordance with a first preferred embodiment of the present invention.

FIG. 4 illustrates a section of a liquid crystal display device associated with a touch panel in accordance with a first preferred embodiment of the present invention.

Referring to FIG. 4, the liquid crystal display device associated with a touch panel includes the polarizing plate embedded liquid crystal panel 1000, and a third substrate 600 having a surface opposite to the first polarizing plate 320 with sensing electrodes 220 and sensing pad electrodes 241 formed thereon.

There are driving pad electrodes 231 formed on an upper side edge of the color filter array substrate 200, a first FPC 410 formed on the driving pad electrodes 231, and a second FPC 420 connected to the sensing pad electrodes 241.

An example is shown in which a touch driving IC 415 is formed on a second FPC 420 side. In this case, for receiving a driving signal from the touch driving IC 415, the touch driving IC 415 is connected to the first FPC 410 with a connection line or a connector 440. And, the connection line or the connector 440 has the other side connected to a driving circuit board 500 which drives the liquid crystal panel for being controlled together.

Depending on cases, the touch driving IC 415 can be formed on the first FPC 410, or on a driving circuit board 500 side of the liquid crystal panel together with the driving circuit board 500. If the touch driving IC 415 is formed on the driving circuit board 500 side of the liquid crystal panel, an area of the FPC will be reduced, and connection between the driving circuit board 500 and the first and second FPCs 410 and 420 will become easy.

In the meantime, the third substrate 600 can be a glass substrate or an insulating transparent film of PET (Polyethylene Terephthalate).

Though not shown, depending on cases, there can be an adhesive layer between the third substrate 600 and the first polarizing plate 320, or instead of the adhesive layer, a closed loop of adhesion paste can be applied to edges of the first polarizing plate 320 for adhesion between the third substrate 600 and the first polarizing plate 320. In this instance, an air gap can be formed in the adhesion paste.

In the meantime, there can be the second polarizing plate 310 under the thin film transistor array substrate 100.

In this instance, a thin film transistor array is included to an inner surface of the thin film transistor array substrate 100, and a color filter array is included to an inner surface of the color filter array substrate 200.

Figure 5:
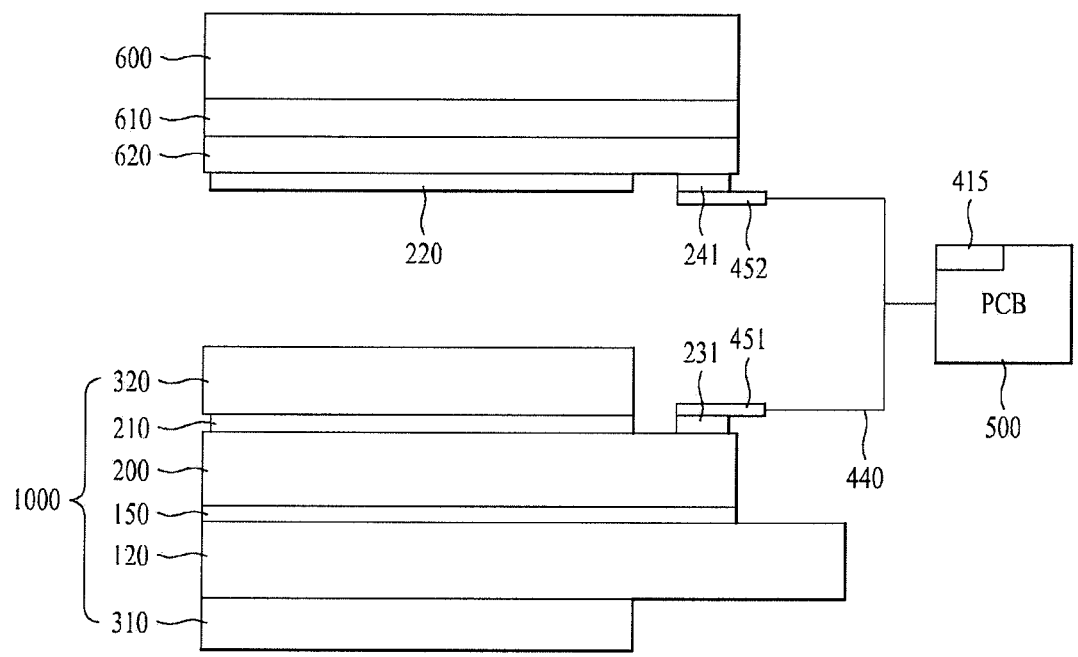
FIG. 5 illustrates a section of a liquid crystal display device associated with a touch panel in accordance with a second preferred embodiment of the present invention.

FIG. 5 illustrates a section of a liquid crystal display device associated with a touch panel in accordance with a second preferred embodiment of the present invention.

Referring to FIG. 5, the liquid crystal display device associated with a touch panel includes a protective layer 620 which serves as a cover glass in addition to the third substrate 600 in the first embodiment. The protective layer 620 is a glass substrate or an insulating transparent film for improving sensitivity to a user's touch, and projecting underlying electrodes.

In this case, there is an adhesive layer 610 between the protective layer 620 and the third substrate 600.

And, different from the first embodiment, the second embodiment shows an example in which the touch driving IC 415 is included in the driving circuit board 500. In this case, the touch driving IC 415 in the driving circuit board 500 is connected to the first and second FPCs 451 and 452 with connection lines or connectors 440 respectively, for applying a driving voltage thereto and sensing a voltage signal and a change of capacitance.

The liquid crystal panel 800 will be described in detail.

Figure 6:
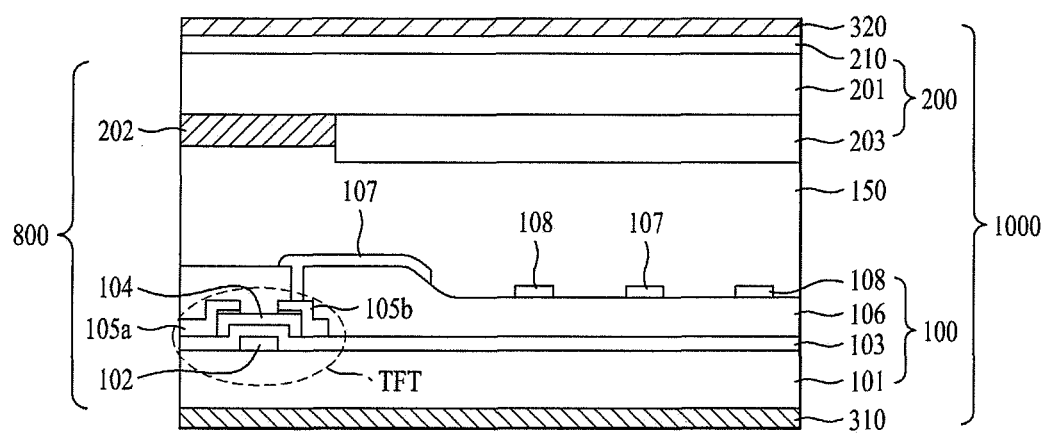
FIG. 6 illustrates a section of an exemplary touch panel of a liquid crystal display device associated with a touch panel of the present invention.

FIG. 6 illustrates a section of an exemplary touch panel of a liquid crystal display device associated with a touch panel of the present invention.

Referring to FIG. 6, as an example, if the liquid crystal panel 800 is an IPS (In-Plane Switching) mode liquid crystal panel, a thin film transistor array substrate 100 thereof includes a first substrate 101, gate lines and data lines perpendicular to each other to define pixel regions, a thin film transistor TFT formed at every crossed portion of the gate lines and the data lines, and pixel electrodes 107 and common electrodes 108 formed at the pixel regions, alternately.

The thin film transistor TFT includes a gate electrode 102 which is a projection from the gate line, a semiconductor layer 104 formed to cover the gate electrode 102 with the gate insulating film 103 disposed therebetween, and a source electrode 105a and a drain electrode 105b formed on both sides of the semiconductor layer 104. In this instance, the source electrode 105a is formed as one unit with the data line.

And, there is a protective film 106 additionally formed between a layer of the pixel electrodes 107 and the common electrode 108 and a layer of the source/drain electrodes 105a/105b, for connecting the pixel electrode 107 to the drain electrode 105b through a contact hole, electrically.

And, the color filter array substrate 200 includes a second substrate 201, a black matrix layer 202 formed at regions except the pixel regions, and a color filter layer 203 matched to at least the pixel regions.

In this case, the second substrate 201 has an outer side surface with driving electrodes 210 and a first polarizing plate 320 formed thereon, and the first substrate 101 has an outer side surface with a second polarizing plate 310 formed thereon.

In a case of the IPS mode liquid crystal panel, in general, though an outer surface ITO film has been formed on an entire outer side surface of the second substrate 201 for preventing static electricity from generating, which is very thin to have a sheet resistance of greater than 300Ω/☐ which is substantial, it has taken place frequently that noise from the liquid crystal panel gives influence to the touch panel if the touch panel is formed on the liquid crystal panel directly. In order to prevent this from taking place, though a shielding layer of an adequate thickness has been formed, since this case affects transmissivity and fabrication steps much, in the liquid crystal display device associated with a touch panel of the present invention, the driving electrodes is formed, not only for merely meeting conditions of thickness and sheet resistance required for prevention of the static electricity from taking place, but also for adequately meeting low sheet resistance of below 100Ω/☐ on the outer side surface of the second substrate 201 by patterning.

Figure 7:
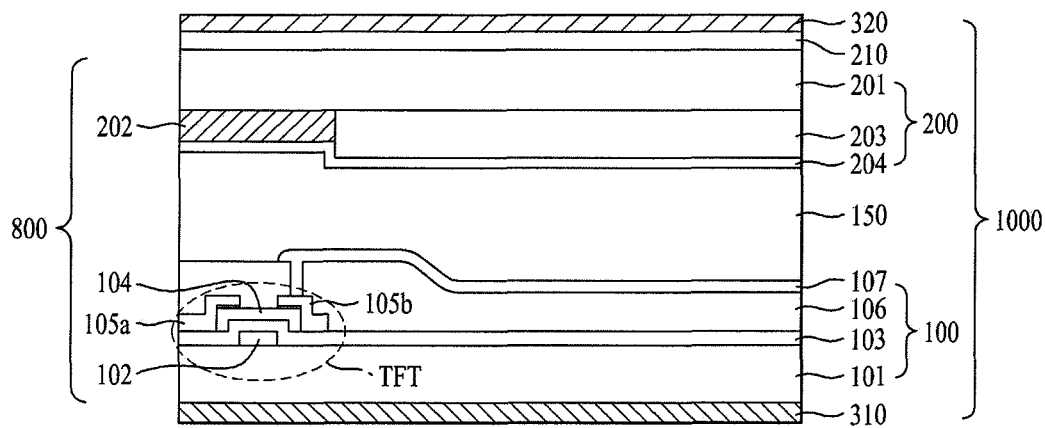
FIG. 7 illustrates a section of another exemplary touch panel of a liquid crystal display device associated with a touch panel of the present invention.

FIG. 7 illustrates a section of another exemplary touch panel of a liquid crystal display device associated with a touch panel of the present invention.

Referring to FIG. 7, the liquid crystal display device associated with a touch panel of a TN (Twisted Nematic) mode includes a common electrode 204 on a color filter array substrate 200 side additionally in comparison to the IPS mode described before, and different from the first embodiment, pixel electrodes 107 formed throughout the pixel regions. Other elements of the embodiment are identical to the foregoing IPS mode liquid crystal display device.

Parts identical to a prior embodiment will be given identical reference numerals, and description of which will be omitted.

In the meantime, a method for fabricating a liquid crystal display device associated with a touch panel of the present invention will be described with reference to FIGS. 2 ~4 and 6.

A transparent electrode is deposited on one side (an upper surface in the drawing shown) of the second substrate 201, and patterned to form a plurality of driving electrodes 210 in one direction spaced from one another.

Then, the second substrate 201 is turned over, and a color filter array step is performed on the other side (a lower side in the drawing shown) to form the color filter array substrate.

Then, a thin film transistor array step is performed on a first substrate 101 to form a thin film transistor array substrate 100.

Then, after forming a liquid crystal layer 150 between the thin film transistor array substrate 100 and the color filter array substrate 200, the array substrates 100 and 200 are bonded together, to form a liquid crystal panel 800.

Then, a first polarizing plate 320 is formed on one side of the second substrate 201 to cover the driving electrodes 210.

A third substrate 600 is provided, and a plurality of sensing electrodes 220 are formed on the third substrate 600 in a direction perpendicular to the driving electrodes 210.

Then, the third substrate 600 and the first polarizing plate 320 are bonded together such that a surface of the third substrate 600 having the sensing electrodes 220 formed thereon is opposite to the first polarizing plate 320.

Then, a step for forming a second polarizing plate 310 on the outer surface of the first substrate 101 can be included, additionally.

On the drawing shown, though the driving pad electrodes 231 and the sensing pad electrodes 241 have shapes of bars, depending on cases, the driving pad electrodes 231 and the sensing pad electrodes 241 can be formed in a shape of polygonal or circular shape including a diamond shape, a square shape, a parallelogram shape, an octagon shape, and a hexagon shape.

And, the mode of the liquid crystal panel is not limited to the IPS, or the TN mode, but can include different kinds of modes, such as a VA mode, an FFS mode, and so on. Since the liquid crystal display device associated with a touch panel of the present invention has two levels of a constant voltage and a ground voltage applied to the driving electrodes 210 in a shape of a square wave in any case, the infiltration of the noise to touch driving on an upper side of the driving electrodes 210 from the underlying liquid crystal panel can be prevented.

As has been described, the liquid crystal display device associated with a touch panel and a method for fabricating the same of the present invention have the following advantages.

First, since the driving electrodes are formed on the outer surface of the color filter array substrate of the liquid crystal panel by patterning, the polarizing plate is covered thereon, and the touch substrate is provided to form the sensing electrodes opposite to the polarizing plate, no additional shielding layer is required, and infiltration of driving noise of the liquid crystal panel to the touch panel can be prevented. That is, by applying the constant voltage and the ground voltage to the side of the driving electrodes, the touch panel can be driven, at the same time with shielding of the noise caused by the driving of the liquid crystal panel.

Second, since the shielding layer is removed, and the driving electrodes used for touch driving is formed of ITO on the outer surface of the liquid crystal panel, one or more than one layer of ITO can be omitted, permitting a material cost saving, reduction of fabrication steps and improvement of yield.

Third, since the driving electrodes are formed on the outer surface of the liquid crystal panel, only the sensing electrodes are formed on the touch substrate without forming an additional insulating film, to omit an insulating film of the touch panel, thereby permitting a material cost saving, reduction of fabrication steps and improvement of yield.

Fourth, the driving electrodes and the sensing electrodes are provided on two substrates different from each other, to enable to form FPCs on substrates different from each other connected to relevant pad electrodes, and to connect the FPCs to the driving circuit of the liquid crystal panel through relevant connectors, for operating the liquid crystal panel in association of touch events. That is, an image on the touch event is displayed on the liquid crystal panel according to an algorithm provided to the driving circuit board.

Fifth, the cover glass is omitted such that the touch substrate can replace a function of the cover glass.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device associated with a touch panel, the device comprising:
    a liquid crystal panel having opposite first and second substrates, and a liquid crystal layer formed between the first and second substrates;
    a plurality of driving electrodes arranged on an outer surface of the second substrate in one direction spaced from one another;
    a first polarizing plate formed on the outer surface of the second substrate including the driving electrodes;
    a third substrate opposite to the first polarizing plate;
    a plurality of sensing electrodes formed on a surface of the third substrate opposite to the first polarizing plate perpendicular to the driving electrodes spaced from one another;
    driving pad electrodes formed at an edge of the outer surface of the second substrate connected to the driving electrodes with first routing lines respectively, and a first FPC (Flexible Printed Circuit) connected to the driving pad electrodes; and
    sensing pad electrodes formed on a surface of the third substrate opposite to the first polarizing plate connected to the sensing electrodes with second routing lines respectively, and a second FPC connected to the sensing pad electrodes.

2. The device as claimed in claim 1, wherein both the driving electrodes and the sensing electrodes are transparent electrodes.

3. The device as claimed in claim 1, wherein the driving electrodes have sheet resistance of below 100Ω/□.

4. The device as claimed in claim 1, wherein the driving electrodes have a square wave applied thereto in succession.

5. The device as claimed in claim 4, wherein the square wave includes two potential levels of a constant voltage and a ground voltage.

6. The device as claimed in claim 1, wherein the first FPC and the second FPC are connected to a driving circuit board of the liquid crystal panel.

7. The device as claimed in claim 6, wherein the first FPC and the second FPC are connected to the driving circuit board of the liquid crystal panel through connectors, respectively.

8. The device as claimed in claim 1, further comprising a touch driving IC included to the first FPC or the second FPC.

9. The device as claimed in claim 6, further comprising a touch driving IC included to the driving circuit board of the liquid crystal panel.

10. The device as claimed in claim 1, further comprising a protective film on the third substrate.

11. The device as claimed in claim 10, wherein the protective film is a glass substrate or an insulating transparent film.

12. The device as claimed in claim 1, wherein the third substrate is a glass substrate.

13. The device as claimed in claim 1, wherein the third substrate is an insulating transparent film.

14. The device as claimed in claim 1, further comprising an adhesive layer disposed between the third substrate and the first polarizing plate.

15. The device as claimed in claim 1, further comprising a closed loop of adhesion paste formed at an edge of the first polarizing plate between the third substrate and the first polarizing plate.

16. The device as claimed in claim 1, further comprising a second polarizing plate on an outer surface of the first substrate.

17. The device as claimed in claim 1, further comprising a thin film transistor array on an inner surface of the first substrate, and color filter array on an inner surface of the second substrate.

18. A method for fabricating a liquid crystal display device associated with a touch panel, the method comprising the steps of:
    forming a plurality of driving electrodes in one direction spaced from one another by depositing a transparent electrode on one surface of a first substrate and patterning the transparent electrode;
    turning over the first substrate, and performing a color filter array step on the other surface of the first substrate;
    forming a thin film transistor array on a second substrate;
    forming a liquid crystal panel by bonding the first and second substrates after forming a liquid crystal layer between the first and second substrates;
    forming a first polarizing plate on the one surface of the first substrate to cover the driving electrodes;

forming a plurality of sensing electrodes on one surface of a third substrate in a direction perpendicular to the driving electrodes spaced from one another; and bonding the third substrate to the first polarizing plate such that the one surface of the third substrate having the sensing electrodes formed thereon is opposite to the first polarizing plate.

19. The method as claimed in claim 18, further comprising the step of forming a second polarizing plate on an outer surface of the second substrate.

* * * * *